May 28, 1946. N. ERLAND AF KLEEN 2,401,233
INTERMITTENT ABSORPTION OR ADSORPTION TYPE REFRIGERATION
Filed July 14, 1942
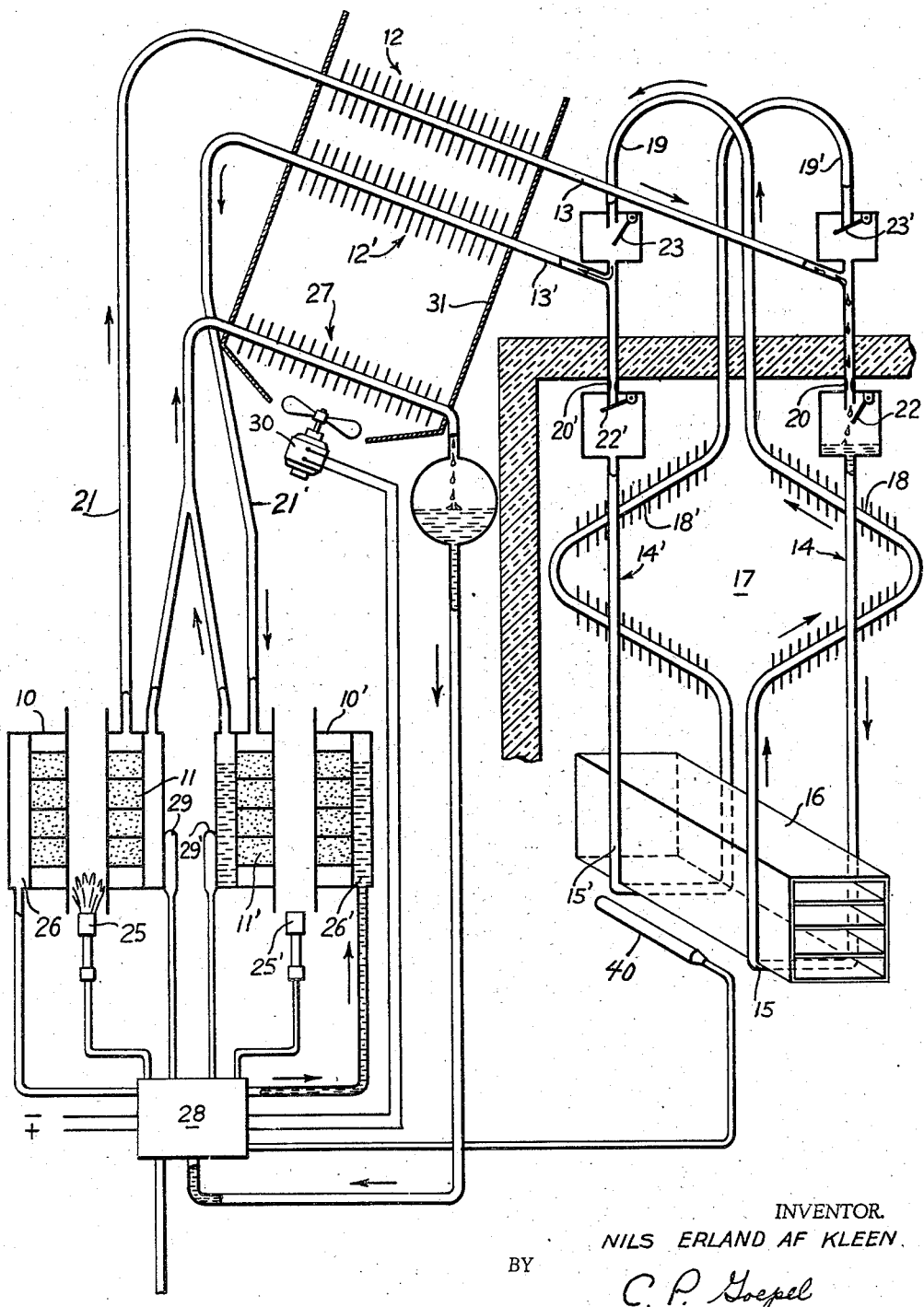
INVENTOR.
NILS ERLAND AF KLEEN
BY
C. P. Goepel
ATTORNEY Patented May 28, 1946

2,401,233

UNITED STATES PATENT OFFICE 2,401,233

INTERMITTENT ABSORPTION OR ADSORPTION TYPE REFRIGERATION

Nils Erland af Kleen, Stockholm, Sweden, assignor to Kleen Refrigerator, Inc., Hoboken, N. J., a corporation of Delaware Application July 14, 1942, Serial No. 450,843

8 Claims. (Cl. 62—5)

This invention relates to new and useful improvements in refrigerating apparatus of the intermittent absorption or adsorption type and more particularly to twin generator-absorber or -adsorber refrigerating systems. Although for convenience the invention will be described in connection with refrigerating apparatus of the absorption type, as the same is equally applicable to refrigerating apparatus of the adsorption type, it is to be understood that the use of the expressions "absorb," "absorber," etc. in the specification and claims is intended to include the corresponding expressions in connection with adsorption type refrigeration.

It is an object of the present invention to provide a refrigerating system of the twin generator-absorber type with a plurality of evaporators including one constructed and arranged to form a heat-absorbing path of flow for the refrigerant during one period of operation of the system and another one constructed and arranged to form another heat-absorbing path of flow for the refrigerant during the other period of operation of the system and to prevent reverse flow of refrigerant through each evaporator and series flow of refrigerant from one evaporator to another, so as to operate said evaporators on alternate cooling and inactive periods in out of phase relation to one another.

The above and other objects of the invention together with the advantages derived therefrom will become more apparent from the following description with reference to the accompanying drawing which illustrates diagrammatically a twin generator-absorber refrigerating system embodying the present invention.

The refrigerating system comprises a pair of generator-absorbers or boiler-absorbers 10 and 10' containing strontium chloride or other suitable absorbent material 11 and 11' for ammonia or other refrigerant employed, a pair of condensers 12 and 12' arranged to be cooled by air, and a pair of evaporators 14 and 14' disposed within a thermally insulated refrigerator compartment or storage space 17.

Each of the evaporators 14 and 14' has a cooling portion 15 and 15', respectively, arranged in thermal contact with the heat-conducting walls of an ice-freezing compartment 16 to cool the latter and has another cooling portion 18 and 18', respectively, arranged out of thermal contact with the freezing compartment and preferably provided with heat transferring fins to cool the air in the storage space 17.

The absorbent chamber of the boiler-absorber 10 is connected by conduit 21 with the condenser 12 which, in turn, is connected to the inlet end of the evaporator 14 by a conduit 13 provided with a restrictor 20 and with a non-return valve 22. The absorbent chamber of the boiler-absorber 10' is connected by a conduit 21' with the condenser 12' which, in turn, is connected to the inlet end of the evaporator 14' by conduit 13' provided with a restrictor 20' and with a non-return valve 22'.

The outlet end of the evaporator 14 may be connected directly to the absorbent chamber of the boiler-absorber 10' or, as shown, may be connected to the conduit 13' by a conduit 19 provided with a non-return valve 23 for passage of the refrigerant to the boiler-absorber 10' by way of the condenser 12'. Similarly, the outlet end of the evaporator 14' may be connected directly to the absorbent chamber of the boiler-absorber 10 or, as shown, may be connected to the conduit 13 by a conduit 19' provided with a non-return valve 23' for passage of the refrigerant to the boiler-absorber 10 by way of the condenser 12.

Each boiler-absorber is alternately heated and cooled by suitable heating means and cooling means respectively to liberate and to reabsorb the refrigerant. In the installation shown, gas burners 25 and 25' are employed as the heating means for the boiler-absorbers 10 and 10', respectively, and a secondary cooling system is employed as the cooling means for each of the boiler-absorbers. The secondary cooling system comprises a vaporization-condensation circuit conduit having a pair of vaporization portions 26 and 26' in heat exchange with the boiler-absorbers 10 and 10', respectively, and an air-cooled condensation portion or secondary condenser 27. The circuit conduit is charged with a suitable heat transferring fluid capable of vaporizing in each vaporization portion and of condensing in the condensation portion to effect cooling of a respective boiler-absorber by heat transfer to the cooling air.

The flow of fuel to one or to the other of the burners 25 and 25' and the flow of cooling liquid from the condensation portion 27 to one or to the other of the vaporization portions 26 and 26' of the secondary cooling system are selectively controlled by a change-over device 28 of any suitable construction well-known in the art for operation of the boiler-absorbers 10 and 10' on alternate heating and cooling periods and in out of phase relationship with respect to one another. The change-over device is made responsive to the temperature of the boiler-absorber 10 by means of thermostat bulb 29 and to the temperature of the boiler-absorber 10' by means of thermostat bulb 29' for operation at a critical temperature attained during the heating period of a respective boiler-absorber to terminate heating and initiate cooling of said boiler-absorber and simultaneously to terminate cooling and initiate heating of the other boiler-absorber as more fully disclosed in Patent No. 2,276,947.

Changes in the demands for refrigeration in the space being cooled may be compensated for by any suitable thermostat means responsive to the temperature in the storage space 17 through the medium of thermostat bulb 40 for controlling the rate of flow of fuel per unit of time to each of the burners 25 and 25' and the operating speed per unit of time of a motor-driven fan assembly 30 employed to vary the rate of flow of air through a duct 31 in which the primary condensers 12 and 12' and the secondary condenser 27 are located.

Having described the construction and arrangement of the different parts of the refrigerating apparatus, the operation is as follows:

Assume that boiler-absorber 10 is being heated by the burner 25 while the boiler-absorber 10' is being cooled by circulation of the heat transferring fluid through the vaporization portion 26' and condensation portion 27 of the secondary cooling system. The refrigerant vapor liberated from the absorbent 11 under influence of the heat supplied passes by way of the conduit 21 to the condenser 12 where such refrigerant vapor is liquefied by cooling action of the cooling air. From the condenser 12, the liquefied refrigerant flows through conduit 13, restrictor 20 and check valve 22 and is delivered to the evaporator 14 where, due to the reduced pressure maintained by the restrictor 20, the refrigerant liquid vaporizes or evaporates to cool the ice-freezing compartment 16 and the air in the storage space 17 by means of the cooling portions 15 and 18, respectively. The refrigerant vapor thus formed passes to the boiler-absorber 10' by way of conduit 19, check valve 23, conduit 13', condenser 12' and conduit 21' and is absorbed by the absorbent 11'. During this period, the evaporator 14' is maintained out of fluid communication with the boiler-absorbers 10 and 10' by the check valves 22' and 23' and is thus inactive to produce any refrigeration.

When the boiler-absorber 10 has been heated to a critical temperature such that substantially all of the refrigerant has been liberated from the absorbent 11, the aforementioned heating and cooling are reversed by the thermostat change-over device 28 so that the boiler-absorber 10' is now heated by the gas burner 25' to liberate the refrigerant from the absorbent 11', while the boiler-absorber 10 is cooled by circulation of the heat transferring fluid through the vaporization portion 26 and condensation portion 27 of the secondary cooling system so as to absorb the refrigerant.

During this period, the refrigerant vapor liberated from the absorbent 11' is liquefied in the condenser 12' and the refrigerant liquid is delivered by way of the conduit 13', restrictor 20' and check valve 22' to the evaporator 14' so that the latter is now active to cool the ice-freezing compartment 16 and the air in the storage space 17 by means of the cooling portions 15' and 18', respectively, while the evaporator 14 is maintained out of fluid communication with the boiler-absorbers 10 and 10' by the check valves 22 and 23 so as to be inactive. The vapor formed in the evaporator 14' passes to the boiler-absorber 10 by way of conduit 19', check valve 23', conduit 13, condenser 12, and conduit 21 and is absorbed by the absorbent 11.

When the boiler-absorber 10' has been heated to a critical temperature such that substantially all of the refrigerant has been liberated from the absorbent 11', the change-over device 28 again operates to reverse the heating and cooling to repeat the cycle of operations above described.

Thus the refrigerant is cycled from one boiler absorber to the other and vice versa in separate evaporator or heat absorbing paths of flow, the check valves 22 and 23 in one path and check valves 22' and 23' in the other path preventing the reverse flow of refrigerant in each of the separate paths and also preventing the flow of refrigerant from one path to the other. As each path is provided with at least two different cooling portions or cooling sections, one employed for ice-freezing and the other employed for air-cooling and as the ice-freezing portion in one path of flow of the refrigerant is thermally connected to the corresponding ice-freezing portion in the other path of flow of the refrigerant by means of the heat conducting walls of the low temperature or ice-freezing compartment 16, a substantially unchanging low temperature is maintained in said thermally connected parts. However, as the air-cooling portion is separate from the ice-freezing portion in each path of flow of the refrigerant and the air-cooling portion in one path of flow is arranged in indirect thermal transfer relation to the corresponding air-cooling portion in the other path of flow of the refrigerant, each of said air-cooling portions will alternately be coated with frost and be defrosted and in this manner a relatively high humidity will be maintained in the storage space 17.

Although I have shown each evaporator in each path of flow of the refrigerant in the form of a single conduit having two cooling portions for the series flow of refrigerant, each evaporator may be in the form of a plurality of conduits or cooling coils including one for the low temperature or ice-freezing compartment 16 and another for air-cooling the storage space 17.

From the foregoing it is believed that the construction, operation and advantages of the invention may be readily understood by those skilled in the art without further description, it being borne in mind that numerous changes may be made in the details disclosed without departing from the spirit of the invention as set out in the following claims:

What I claim is:

1. Refrigerating apparatus comprising an intermittent type absorption refrigerating system having two boiler-absorbers and refrigerant conduit means including condensing means and a plurality of evaporators connecting said boiler-absorbers, heating means for each of said boiler-absorbers, control means for said heating means to heat said boiler-absorbers alternately, and valve means in said conduit means constructed and arranged to interrupt the flow of refrigerant to one of said evaporators during a heating period of one of said boiler-absorbers and interrupt the flow of refrigerant to another one of said evaporators during a heating period of the other one of said boiler-absorbers.

2. A refrigerator comprising a cabinet having a plurality of compartments to be cooled including a relatively low temperature compartment and a relatively high temperature compartment, and refrigerating apparatus for cooling said compartments substantially continuously including two absorbent-containing boiler-absorbers, a plurality of evaporator parts including two for said low temperature compartment and two others for said higher temperature compartments, refrigerant conduit means including condensing means connecting said evaporator parts with each of said boiler-absorbers, heating means for each of said boiler-absorbers, control means for said heating means to heat said boiler-absorbers alternately, and valve means in said conduit means constructed and arranged to prevent flow of refrigerant through one of the evaporator parts for each of said low temperature and higher temperature compartments during the heating period of one of said boiler-absorbers and to prevent flow of refrigerant through the other one of the evaporator parts for each of said low temperature and higher temperature compartments during the heating period of the other one of said boiler-absorbers.

3. In combination, an insulated storage space, refrigerating apparatus for cooling said storage space comprising an intermittent type absorption refrigerating system having two boiler-absorbers, two condensers and two evaporators, one of said evaporators being connected for the flow of refrigerant therethrough from one of said boiler-absorbers and one of said condensers to the other one of said boiler-absorbers during one period of operation and the other one of said evaporators being connected for the flow of refrigerant from the second boiler-absorber and second condenser to the first boiler-absorber during the other period of operation of the system, each of said evaporators having a portion in heat exchange relationship with a freezing chamber and a second portion in heat exchange relationship with the air in said storage space, said first portions being in direct heat exchange relationship with each other through the medium of said freezing chamber and said second portions being spaced from each other so as to be in indirect heat exchange relationship with each other through the medium of the air in said storage space, heating means for each of said boiler-absorbers, and control means for said heating means to heat said boiler-absorbers alternately.

4. The combination as set forth in claim 3, in which the first and second portions of each evaporator are connected for the series flow of refrigerant therethrough.

5. In combination, an insulated storage space, refrigerating apparatus for cooling said storage space comprising an intermittent type absorption refrigerating system having two boiler-absorbers, two condensers and two evaporators, one of said evaporators being connected for the flow of refrigerant therethrough from one of said boiler-absorbers and one of said condensers to the other one of said boiler-absorbers during one period of operation of the system and the other one of said evaporators being connected for the flow of refrigerant therethrough from the second boiler-absorber and second condenser to the first boiler-absorber during the other period of operation of the system, each of said evaporators having a portion in heat exchange relationship with a freezing chamber and a second portion in heat exchange relationship with the air in said storage space, said first portions being in direct heat exchange relationship with each other through the medium of said freezing chamber and the second portions being spaced from each other so as to be in indirect heat exchange relationship to each other through the medium of the air in said storage space, means to prevent the flow of refrigerant through one evaporator when flow is taking place through the other evaporator, heating means for each of said boiler-absorbers, and control means for said heating means to heat said boiler-absorbers alternately.

6. Refrigerating apparatus comprising a pair of boiler-absorbers, heating means and cooling means for said boiler-absorbers, control means for said heating means and cooling means to operate said boiler-absorbers alternately on generating and absorbing periods in out of phase relation to one another, a pair of evaporators, conduit means providing refrigerant flow paths communicating with each of said evaporators and each of said boiler-absorbers, and refrigerant flow regulating means in said conduit means constructed and arranged to interrupt communication between one of said evaporators and said boiler-absorbers when one of said boiler-absorbers is operating on its absorbing period and interrupt communication between the other one of said evaporators and said boiler-absorbers when the other one of said boiler-absorbers is operating on its absorbing period.

7. Refrigerating apparatus comprising a pair of absorbent-containing boiler-absorbers, refrigerant conduit means including a pair of evaporators connecting said boiler-absorbers, means for operating said boiler-absorbers alternately on generating and absorbing periods in out of phase relation to one another, and refrigerant flow regulating means in said conduit means constructed and arranged to direct refrigerant from a respective boiler-absorber operating on the generating period to a selected one of said evaporators and to direct the refrigerant from said selected evaporator to the other boiler-absorber.

8. Refrigerating apparatus comprising a pair of boiler-absorbers, heating means and cooling means for said boiler-absorbers, control means for said heating means and cooling means to operate said boiler-absorbers alternately on generating and absorbing periods in out of phase relation to one another, a pair of evaporators, conduit means providing refrigerant flow paths communicating with each of said evaporators and each of said boiler-absorbers, and fluid flow control means in said conduit means constructed and arranged to isolate each of said evaporators alternately from the other evaporator and each of said boiler-absorbers.

NILS ERLAND AF KLEEN.